United States Patent Office
3,110,687
Patented Nov. 12, 1963

3,110,687
POLYMERS OF SUBSTITUTED AROMATIC COMPOUNDS AND PROCESS FOR THEIR PRODUCTION
George H. Smith, Maplewood, Minn., assignor to Minnesota Mining and Manufacturing Company, St. Paul, Minn., a corporation of Delaware
No Drawing. Filed Oct. 19, 1959, Ser. No. 847,083
3 Claims. (Cl. 260—2)

This invention relates to polymers containing conjugated methylenic double bonds, and more particularly to polyarylmethylidenes, and to the process for their preparation.

It is known that $\alpha,\alpha'$-dichloro-p-xylene can be condensed with sodium in a typical Wurtz reaction to produce poly-p-xylylene of low molecular weight. This polymer, which man also be made of higher molecular weight by methods involving pyrolysis, contains recurrent units consisting of p-phenylene radicals joined by divalent ethylene radicals. The polymers of the present invention contain recurrent units consisting of arylene radicals joined by divalent vinylene radicals which possess a double bond, viz. —CH=CH— radicals. As these are conjugated with the double bonds in the arylene rings, it will be apparent that the polymers of the present invention are quite different from the poly-p-xylylene polymers heretofore described.

It is an object of the present invention to prepare certain polymeric compounds which contain a large number of conjugated double bonds and which are solid, fluorescent materials. It is another object of the invention to provide a process for the preparation of such compounds. Other objects will be apparent from the disclosure hereinafter made.

The polymers of the invention are characterized by containing arylene radicals connected by vinylene radicals. For convenience in terminology and structural representation, they may be considered as containing recurring units which have the formula

in which $m$ is 2 or 3 and $n$ is a number from about 2 to 100 or more, and Ar is an arylene radical.

The polymers contain methylidene groups, and thus may be designated polymethylidinoarylenes. As they are prepared by the condensation of di(halomethyl)-substituted or tri(halomethyl)-substituted aromatic hydrocarbons, they probably are terminated by the residues of such compounds. It is believed that the polymers may therefore be represented by one of the following structural formulae, depending upon the starting materials, inasmuch as di-substituted starting compounds will yield linear polymers, while tri-substituted compounds will produce crosslinked polymers. For convenience, substituted phenylene compounds are used for illustrative purposes.

A.

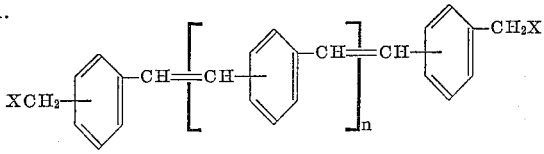

B.

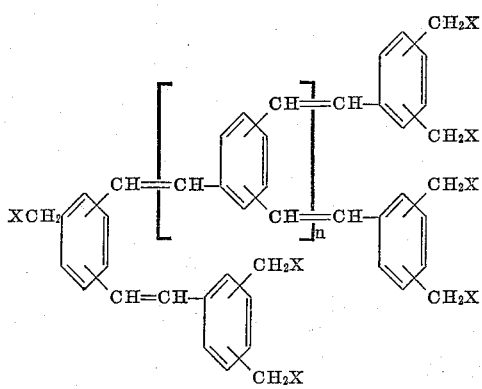

Formula B illustrates two of the possible terminal structures of polymers of the tri(halomethyl)-substituted aromatic hydrocarbons, i.e. two of the three terminal structures are shown as single monomer residues each reacted through only one halomethyl group while the third contains two monomer residues one of which is reacted through two and the other through one halomethyl group.

In the formulae, and throughout this specification, X is used to represent a middle halogen, i.e., chlorine or bromine, while $n$ represents a number from 2 to 100. As is known, polymers consist of chains of varying lengths, and therefore $n$ commonly represents an average value and is not necessarily a whole number.

The polymers of the invention are solid materials, generally more or less colored and tending to be of a yellow or darker shade, which are highly fluorescent in daylight and ultraviolet light. They are insoluble in water and the common organic solvents, such as benzene, chloroform, ethanol, acetone, methyl ethyl ketone, carbon tetrachloride and the like, and appear to be very slightly soluble in "Aroclor 1262" (a trademark for highly chlorinated biphenyl). The higher molecular weight compounds, such as those in which $n$ is 20 to 30 or higher, are high melting materials which do not fuse even above 300° C. Polymers of lower molecular weight, such as those in which $n$ is about 5 to 10, are thermoplastic materials when linear, which have softening points below 300° C. Polymers having the formula B are of course crosslinked, and are hard, thermoset materials.

The compounds of the invention are useful as fluorescent pigments when they are of higher molecular weight. Compounds of lower molecular weight can be molded into solid articles by the use of heat and pressure, which articles can be cut or shaped using metalworking or woodworking tools.

The polymers of the invention are prepared by treating a compound having the formula:

wherein Ar is an aromatic hydrocarbon radical derived from benzene or naphthalene, X is a middle halogen and $m$ is an integer of the group consisting of 2 and 3, with an alkali metal amide in the presence of liquid ammonia. Compounds suitable for use as starting materials in the process of the invention include, for example, $\alpha,\alpha'$-dichloro-p-xylene, a,a'-dibromo-p-xylene, a,a'-dichloro-m-xylene, 1,2,4-tris(bromomethyl)benzene, 1,3,5-tris(bromomethyl)benzene, 1,2,5-tris(bromomethyl)benzene, 1,5- bis(bromomethyl)naphthalene and the like. It will be apparent that mixtures of the bis- and tris-substituted compounds can be employed, to produce polymers crosslinked to varying degree depending on the amount of tris-substituted component.

Suitable condensing agents are the alkali metal amides, such as sodamide and potassamide. The starting material is suspended os dissolved in an inert solvent, such as benzene, or in liquid ammonia, and is added to the alkali metal amide, conveniently suspended in liquid ammonia. Inasmuch as liquid ammonia is used, the reaction temperature is at or below −33° C. when the reaction is run at atmospheric pressure although higher temperatures may be used if the reaction is run at higher pressure. Other variations in technique, such as reverse addition, may also be employed.

During the reaction, the halogen is eliminated as alkali metal halide or ammonium halide, while the polymer precipitates as a fine powder as it is formed. For isolation, the solids are filtered from the reaction mixture after evaporation of the liquid ammonia, the alkali metal or ammonium halide is removed by washing with water, and the polymer remains in finely divided solid form, ready for use as such; or, if desired, it may be milled to finer particles for use as a pigment in vehicles such as varnishes or lacquers.

The molecular weight of the polymers formed depends upon the ratio of sodamide to halomethyl aromatic compound and the reaction conditions, such as the concentration of the reactants. When lower molecular weight linear polymers are prepared, they can be molded into solid articles in the usual way using heated dies and moderate pressures. The higher molecular weight linear polymers can also be molded, but higher temperatures and pressures are required.

The invention is more specifically illustrated by the following examples.

*Example 1*

Sodamide is prepared in suspension by slowly adding 4.1 parts of fresh sodium in small pieces to 200 parts of liquid ammonia, using a few crystals of ferric nitrate as a catalyst. The mixture is stirred until the blue color which forms disappears and a suspension of sodamide is formed. A solution is prepared by dissolving 23.76 parts of 1,4-bis(bromomethyl)benzene in refluxing benzene and the solution is mixed rapidly with the suspension of sodamide in liquid ammonia. This is accomplished by adding the benzene solution (which is advantageously kept warm during the addition, so as to prevent precipitation of the dibromo compound from the benzene) to the suspension of sodamide in liquid ammonia (which is at or below −33° C.). A minor amount of the liquid ammonia is flashed off during the addition, but temperature of the reaction mixture remains at approximately −33° C. since liquid ammonia is still present. The reaction mixture is stirred for about 45 minutes, and 4 parts of solid ammonium chloride are then added, together with 100 parts of diethyl ether, with vigorous stirring. The reaction mixture is then allowed to stand until the ammonia has evaporated. The resulting slurry is stirred with 150 parts of hot benzene and 200 parts of hot water and filtered. The solid material remaining on the filter is taken up in a large excess of water and boiled to remove soluble substances and filtered. Boiling with water is repeated 3 times, until the filtrate no longer shows the presence of any bromine ion by the use of silver nitrate test solution. There are obtained 8.6 parts of a bright yellow solid which do not melt when heated to 330° C. The polymethylidinobenzene (which may also be termed polyparaxylylidene) thus prepared is brilliantly fluorescent when exposed to ultraviolet light, producing a bluish-green fluorescence. The yield is about 94.5 percent. Analysis indicates that the molecular weight is about 3300. The yellow powder is milled with a varnish base paint vehicle, to produce a bright yellow paint.

*Example 2*

Sodamide is prepared as described in Example 1 using 4.1 parts of sodium metal and 200 parts of liquid ammonia. To this is rapidly added a solution in toluene of 21.4 parts of 1,3,5-tris(bromomethyl)benzene (prepared by the method of Colson, Annales de Chemie et de Physique v. 6, 94 (1885)). The reaction mixture is stirred for about 45 minutes and 4 parts of solid ammonium chloride are added, together with 100 parts of diethyl ether. After vigorous stirring the ammonia is allowed to evaporate and the solid product is isolated as before. A bright yellow solid, which is insoluble in the common organic solvents and which does not melt below 350° C., is obtained in over 90 percent yield.

*Example 3*

The procedure of Example 1 is repeated using 4.1 parts of sodium metal, 200 parts of liquid ammonia and 26.1 parts of 1,6-bis(bromomethyl)naphthalene (prepared by the method described by Feist, J. prakt. Chem., 139, 261–8 (1934)). A fluorescent, high melting yellow-orange solid is obtained in over 90 percent yield.

*Example 4*

The procedure described in Example 1 is repeated, using 4.6 parts of sodium metal, 200 parts of liquid ammonia and 17.5 parts of 1,4-bis(chloromethyl)benzene dissolved in toluene. A bright yellow fluorescent solid is obtained which is substantially identical in most respects with that produced in Example 1. The only significant difference between this material and that prepared in Example 1 is in the presence of chlorine instead of bromine.

What is claimed is:

1. A solid, bright yellow, fluorescent polymer of the formula:

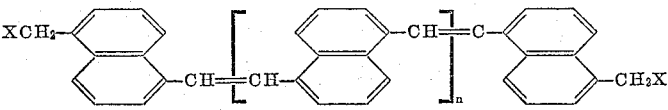

wherein X is a halogen of the group consisting of chlorine and bromine and $n$ is a number from 2 to about 100.

2. A solid, bright yellow fluorescent polymer of the formula:

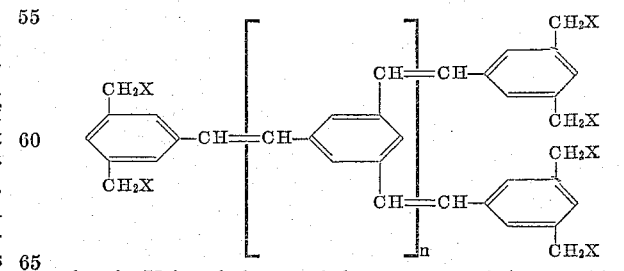

wherein X is a halogen of the group consisting of chlorine and bromine and $n$ is a number from 2 to about 100.

3. A process for the preparation of solid polymers containing aromatic rings connected by divalent vinylene radicals and containing multiple conjugated double bonds, which comprises treating a compound of the formula:

$$Ar-(CH_2X)_m$$

wherein Ar is a radical derived from an aromatic hydrocarbon of the group consisting of benzene and naphthalene, X is a halogen chosen from the group consisting of chlorine and bromine, $m$ is an integer of the group consisting of 2 and 3, and when $m$ is 2, the —$CH_2X$ groups are in para position; with an alkali metal amide in the presence of liquid ammonia, to bring about condensation with the elimination of ammonium halide.

References Cited in the file of this patent

UNITED STATES PATENTS 2,914,489   Hall _____ Nov. 24, 1959

OTHER REFERENCES

McDonald et al.: Journal of American Chemical Society, vol. 82, pages 4669–4671, September 1960.

Drefahl et al.: Chemische Berichte, vol. 91, pages 1274–1280 (1958).

Schmitt et al.: Academic Des Sciences Comptes Rendus, vol. 242, pages 649–651 (1956).

Remy, Treatise on Inorganic Chemistry, vol. 1, pages 772 (1956).

Brown et al.: Journal Chem. Soc. (London), pages 3270–77, October 1953.